Feb. 3, 1953   E. C. KIEKHAEFER   2,627,255
TWO-CYCLE ENGINE AND METHOD OF OPERATING THE SAME
Filed Jan. 7, 1950   5 Sheets-Sheet 1
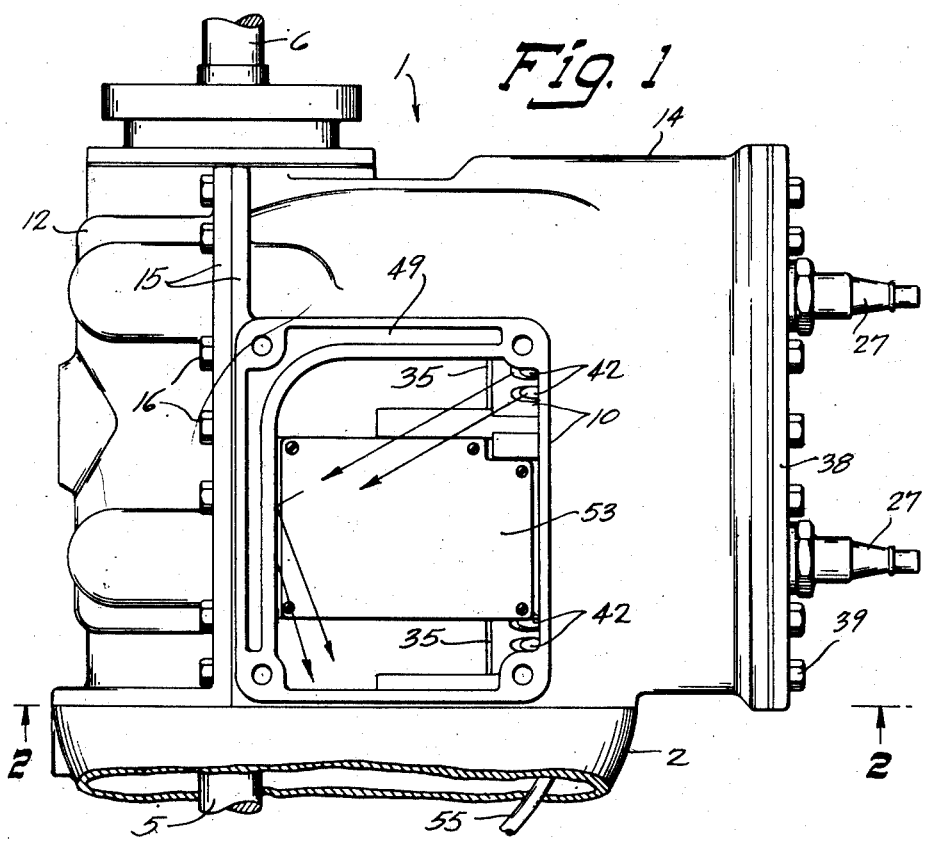
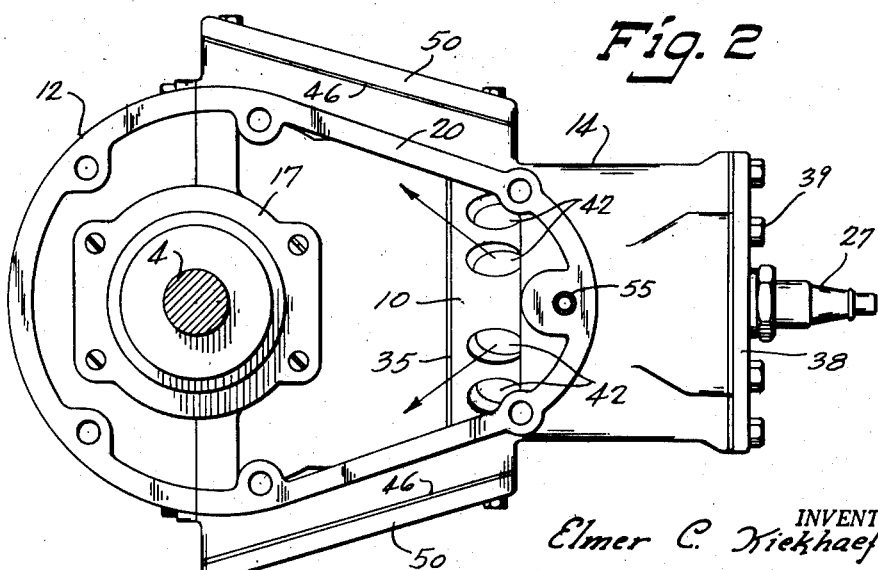
INVENTOR.
Elmer C. Kiekhaefer
BY
Andrus & Scales
Attorneys Feb. 3, 1953    E. C. KIEKHAEFER    2,627,255
TWO-CYCLE ENGINE AND METHOD OF OPERATING THE SAME
Filed Jan. 7, 1950    5 Sheets-Sheet 2

INVENTOR.
Elmer C. Kiekhaefer
BY Andrus & Sceales
Attorneys

Feb. 3, 1953   E. C. KIEKHAEFER   2,627,255
TWO-CYCLE ENGINE AND METHOD OF OPERATING THE SAME
Filed Jan. 7, 1950   5 Sheets-Sheet 3

INVENTOR.
Elmer C. Kiekhaefer
BY Andrus & Sceales
Attorneys

Feb. 3, 1953 E. C. KIEKHAEFER 2,627,255
TWO-CYCLE ENGINE AND METHOD OF OPERATING THE SAME
Filed Jan. 7, 1950 5 Sheets-Sheet 4

INVENTOR.
Elmer C. Kiekhaefer
BY Andrus & Sceales
Attorneys

Feb. 3, 1953 — E. C. KIEKHAEFER — 2,627,255
TWO-CYCLE ENGINE AND METHOD OF OPERATING THE SAME
Filed Jan. 7, 1950 — 5 Sheets-Sheet 5

INVENTOR.
Elmer C. Kiekhaefer
BY Andrus & Sceales
Attorneys

Patented Feb. 3, 1953

2,627,255

UNITED STATES PATENT OFFICE 2,627,255

TWO-CYCLE ENGINE AND METHOD OF OPERATING THE SAME

Elmer C. Kiekhaefer, Cedarburg, Wis.

Application January 7, 1950, Serial No. 137,450

8 Claims. (Cl. 123—41.78)

This invention relates to two-cycle internal-combustion engines and particularly to the scavenging and exhaust systems of engines utilizing the crankcase for induction and precompression of the fuel.

The invention provides for the introduction of the fuel charge from the crankcase oppositely into the cylinder and discharge of the exhaust from the cylinder to allow a more complete scavenging and recharging of the cylinder.

A principal object of the invention is to provide for the most direct possible passage of the fuel from the crankcase chamber to the upper end of the combustion chamber.

Another object of the invention is to introduce the fuel into the cylinder with a minimum of angular motion and turbulence.

Another object is to direct the fuel so as to scavenge more completely the upper end of the combustion chamber.

Another object is to provide for the more complete displacement of the burned gases by the fresh fuel charge with less intermixing.

Another object is to provide for the more complete exhaustion of the burned gases prior to the opening of the intake ports.

Another object is to eliminate or reduce to a minimum the obstructions to the exhaust passage particularly in engines of limited size and weight.

Another object is to provide for discharge passage of the exhaust of multiple cylinders disposed in line with a minimum of angularity and turbulence.

Another object is to simplify the construction of a two-cycle engine having opposite intake ports and transfer passages.

Another object is to facilitate assembly and replacement of the cylinders.

Another object is to provide for the interchangeability of the cylinders.

Another object is to provide for advancing the intake and exhaust ports and increasing the compression ratios for high speed operation by replacing the cylinders and without requiring substantial reconstruction of the engine.

These and other objects and advantages will be more fully set forth in the following description of a preferred embodiment of the invention as illustrated in the accompanying drawings.

In the drawings:

Figure 1 is a side elevation of a two-cylinder, two-cycle engine mounted on the drive-shaft housing of an outboard motor and with a side cover plate and coolant jacket removed to show the interior of the exhaust chamber;

Fig. 2 is a bottom plan view of the engine showing the lower end of the exhaust chamber which opens into the drive-shaft housing;

Figure 3:
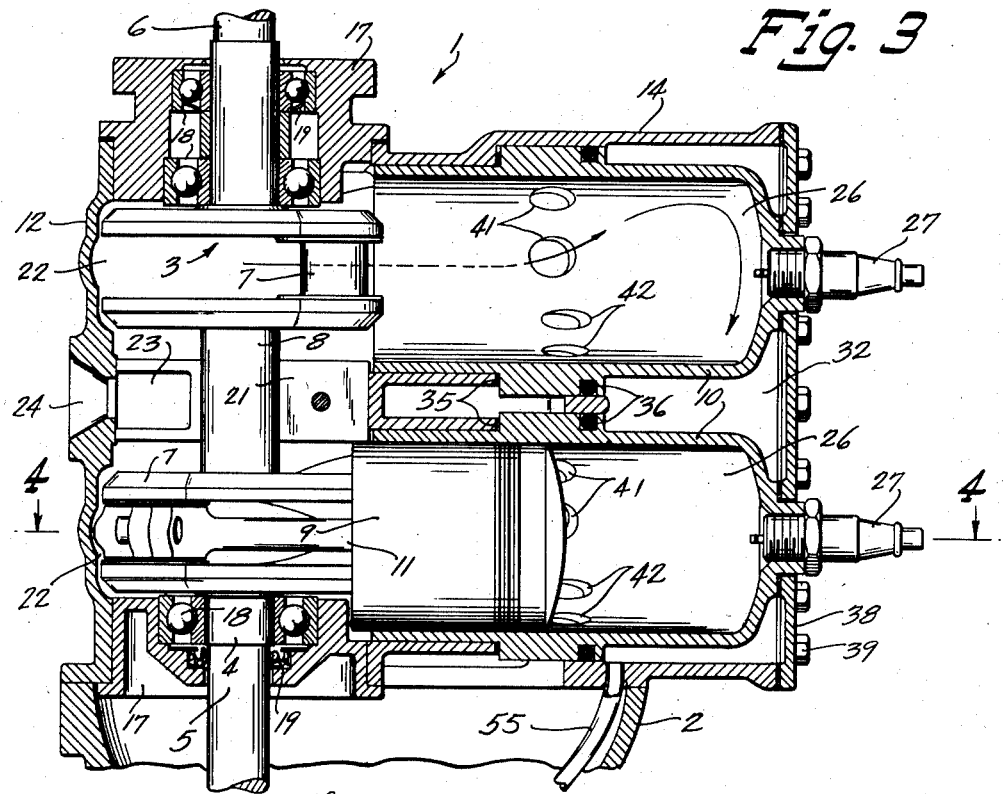
Fig. 3 is a vertical axial section taken longitudinally of the engine and with upper connecting rod and piston of the engine omitted to show certain details of construction.
Figure 4:
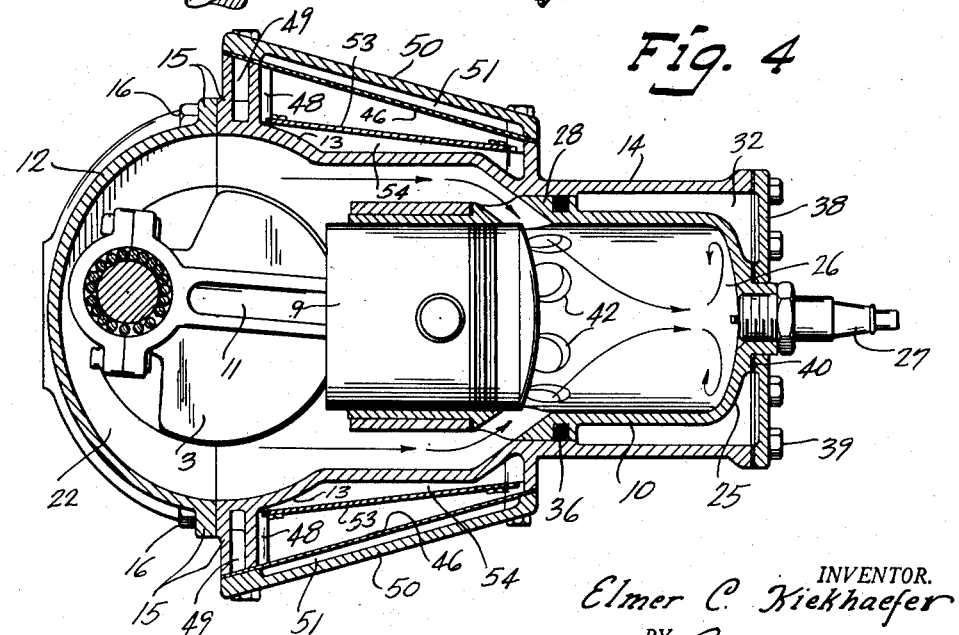
Fig. 4 is a horizontal section taken axially of the lower cylinder on line 4—4 of Fig. 3.
Figure 5:
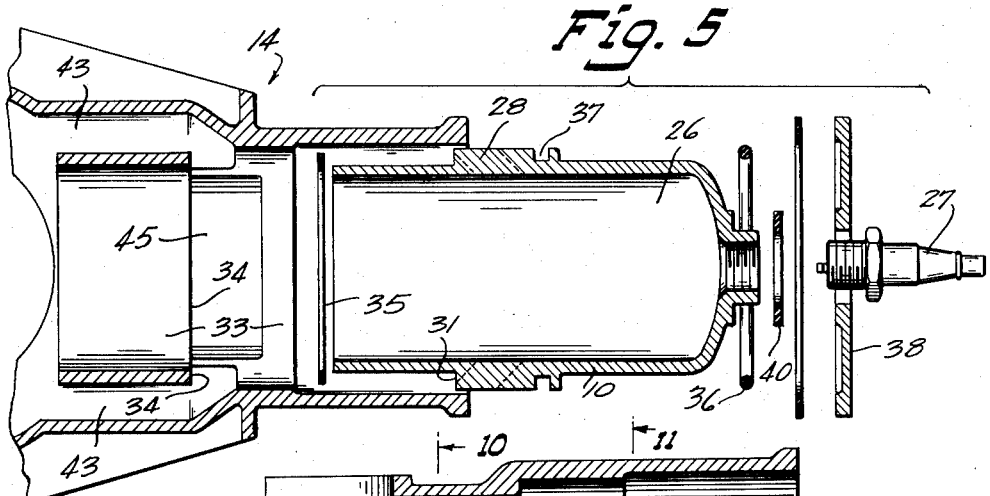
Fig. 5 is a view taken axially of the parts of a cylinder just prior to the assembly of the same in the cylinder block of the engine.
Figure 6:
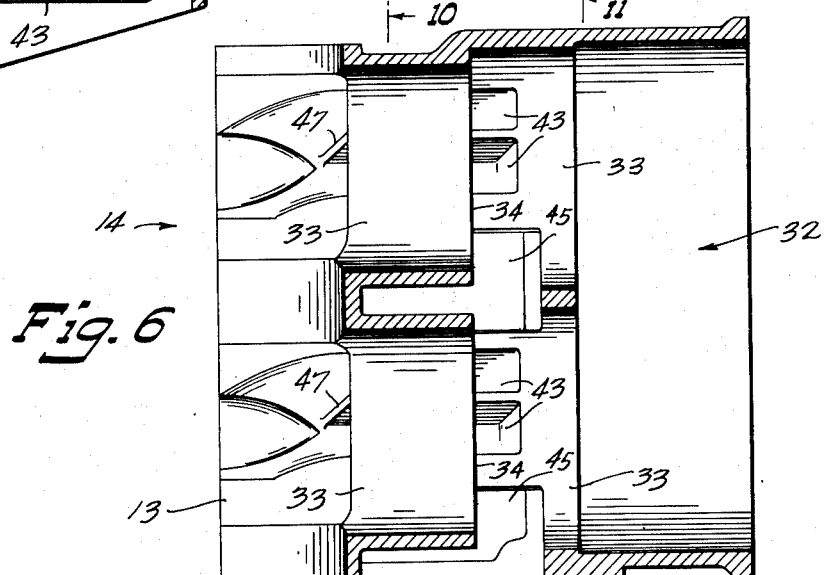
Fig. 6 is a vertical axial section taken longitudinally of the cylinder block.

The engine 1 shown in the drawings is an in-line, alternately firing, two-cylinder engine and is shown mounted on the upper end of an outboard motor drive-shaft housing 2. The crankshaft 3 of engine 1 is disposed vertically and connected at its lower end 4 to the outboard motor drive-shaft 5 which extends downwardly in housing 2. The upper end 6 of crankshaft 3 is adapted to carry a flywheel, not shown, above the engine.

The engine crankshaft 3 includes the two crank throws 7 spaced 180° and the intermediate bearing 8. The pistons 9 carried in the respective cylinders 10 are connected to the respective cranks 7 by the connecting rods 11 and have relatively flat or slightly convex upper ends.

The crankcase of the engine comprises the crankcase member 12 and the complementary skirt portions 13 of the engine block 14. The opposite flanges 15 of crankcase member 12 and block 14 are secured by the bolts 16 and are joined along a parting line defined by a plane passing transversely of the engine through the axis of crankshaft 3.

The upper and lower bearing assemblies 17 are provided with the ball bearing units 18 which support the upper and lower ends 6 and 4, respectively, of the crankshaft. Assemblies 18 include suitable shaft seals 19 and are adapted to fit within the machined open ends of the crankcase to close the same and to support the crankshaft therein.

Block 14 and crankcase member 12 are together provided with a planiform lower face 20 which corresponds with and fits the upper open end of driveshaft housing 2 of the outboard motor, not otherwise shown.

The split bearing unit 21 is assembled on the center main bearing 8 of the crankshaft 3 and fits within the crankcase to divide the same into the upper and lower individual crank chambers 22.

In the operation of engine 1, the fuel charge is drawn into each crank chamber 22 during the upward stroke of the corresponding piston and is compressed in the crank chamber for transfer into the cylinder at the end of the downstroke of the piston as will be described.

The center main bearing unit 21 is provided with the central passage 23 which opens into the adjacent upper and lower crank chambers 22 and is controlled by valve means, not shown.

A carburetor, not shown, carried by crankcase member 12 is adapted to supply the engine fuel charge through the opening 24 in member 12 to passage 23 and to the crank chambers in response to the upward induction stroke of the corresponding pistons.

Each cylinder 10 is preferably formed of cast iron or the like and is carried, as will be described, by block 14 with the lower end of each thereof opening into the respective crank chamber 21 of the crankcase. The dome 25 closing the combustion chamber 26 of the cylinder is provided with a threaded hole adapted to receive the spark plug 27 for engine ignition.

The outer dimensions of each cylinder 10 are cylindrical and comprises generally a thin-walled sleeve excepting for the thicker section of the circumferential rim 28 approximately centrally between the upper and lower ends of the cylinder.

The lower outer sleeve diameter 29 and the larger diameter 30 of the rim 28 are machined to close tolerances concentrically with the axis of the cylinder and provide the shoulder 31 facing the lower end of the cylinder.

The cast block 14 of the engine is provided with the cavity 32 which opens oppositely of the crankcase and with the cylindrical stepped bores 33 opening from the lower end of the cavity into each crank chamber 22.

Bores 33 are disposed to receive the lower ends of cylinders 10 and carry the same with the upper ends thereof forming the combustion chambers 26 unsupported in cavity 32. Each stepped bore 33 is dimensioned to fit the corresponding diameters 29 and 30 of the cylinder and is provided with a shoulder 34 corresponding with shoulder 31.

In the assembled engine, the gasket 35 is disposed between shoulders 31 and 34, and an O-ring gasket 36 is carried in the circumferential groove 37 formed near the upper end of rim 28 of the cylinder and in sealing engagement with the larger diameter of bore 33. The cover 38 secured by the bolts 39 to block 14 closes cavity 32 and is provided with suitable holes through which the spark plugs project. The gasket rings 40 are disposed between cover 38 and the upper dome ends of the cylinders and around each spark plug to seal the openings in cover 38. Cover 38 and the bolts 39 serve to secure cylinders 10 axially in block 14 and seated against shoulders 34.

Cylinders 10 are provided with the intake and exhaust ports 41 and 42, respectively, which are drilled in the thicker rim section 28 prior to assembly of the engine, as will be described.

In the two-cycle operation of engine 1 the exhaust gases are discharged at the end of the downward power stroke of the piston and are cleared from the cylinder or scavenged by the fresh fuel charge which is introduced under pressure into the cylinder immediately thereafter and before the piston begins its upward compression stroke.

Ports 41 and 42 are controlled by the respective pistons 9 which cover the ports during the compression and power strokes and uncover the same during a period at the end of the downward stroke.

Ports 42 are disposed slightly higher than ports 41 with respect to the piston stroke so that the exhaust ports 42 are opened ahead of the intake ports to permit the burned gases to "blow down" to lower pressures so that the gases will be displaced by the compressed fuel charge when ports 41 are uncovered.

Ports 42 communicate with the exhaust cavity 44 which opens into each bore 33 as at 45 and provides for discharge of the exhaust into the upper end of the outboard motor drive-shaft housing 2.

The exhaust cavity 44 as formed in block 14 opens from the lower face 20 of block 14 into drive-shaft housing 2 and is otherwise closed on each side of the block by the plates 46.

According to the invention, ports 41 are disposed with respect to the transfer passages 43 and cylinders 10 to receive the compressed fuel charge directly from the respective crank chamber 22 and direct the same into the cylinder with a minimum of angularity and turbulence and to displace or scavenge more completely the gases remaining in the combustion chamber. According further to the invention, ports 42 and the exhaust cavity 44 are disposed to direct and discharge the exhaust gases from the engine 1 into drive-shaft housing 2 with a minimum of change of direction and turbulence, allowing a more complete and efficient scavenging of the engine.

Two transfer passages 43 for each cylinder 10 are formed in block 14 by cores, not shown, and are disposed substantially oppositely with respect to the cylinder.

The number of ports employed may depend on the size of the engine, and in larger engines the ports may be other than round for greater throat section.

Figure 7:
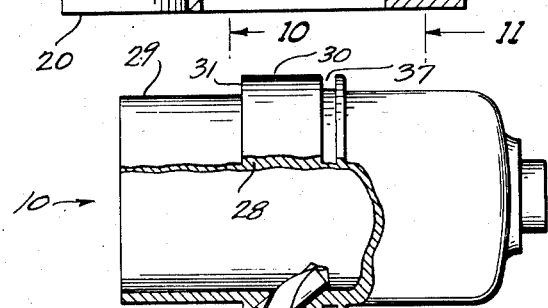
Fig. 7 is a view illustrating the manner of the drilling of the cylinder ports.
Figure 8:
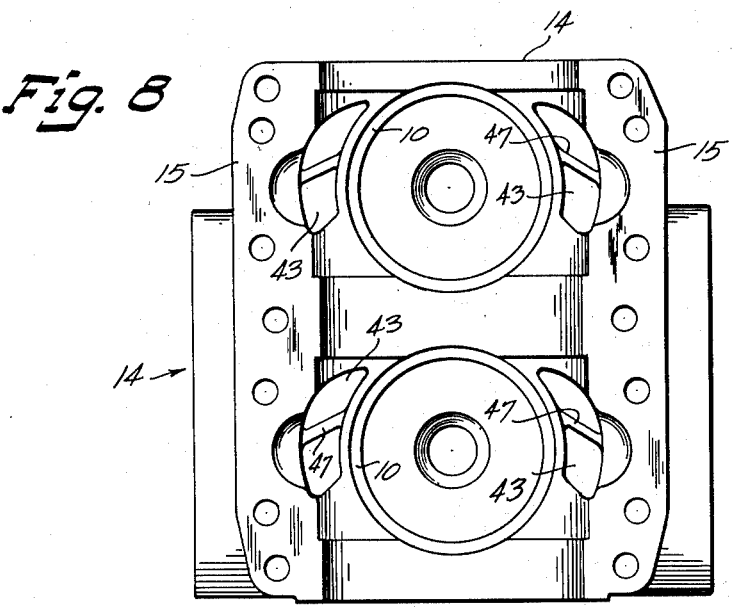
Fig. 8 is a front elevation of the cylinder block and the "lower" ends of the cylinders looking "upwardly" of the same.
Figure 9:
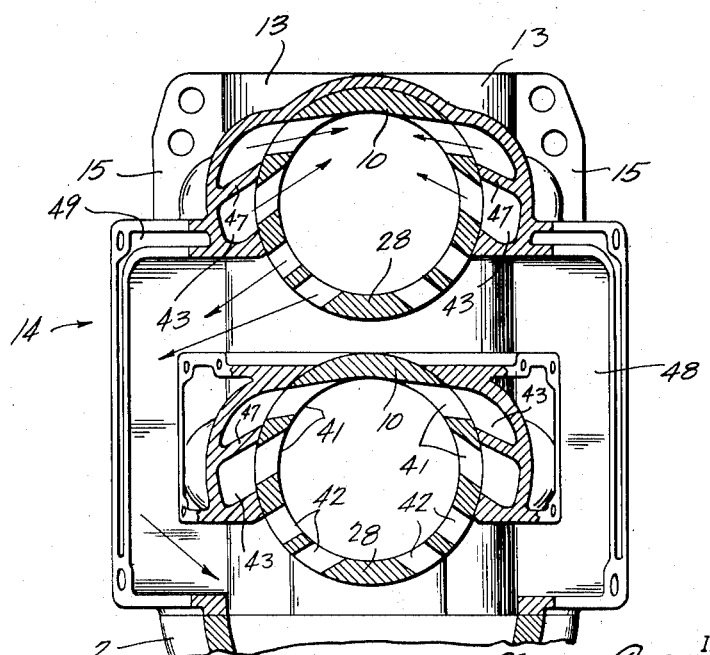
Fig. 9 is a transverse vertical sectional view of the engine taken through the cylinder ports and showing their relative location with respect to the cylinder axes.
Figure 10:
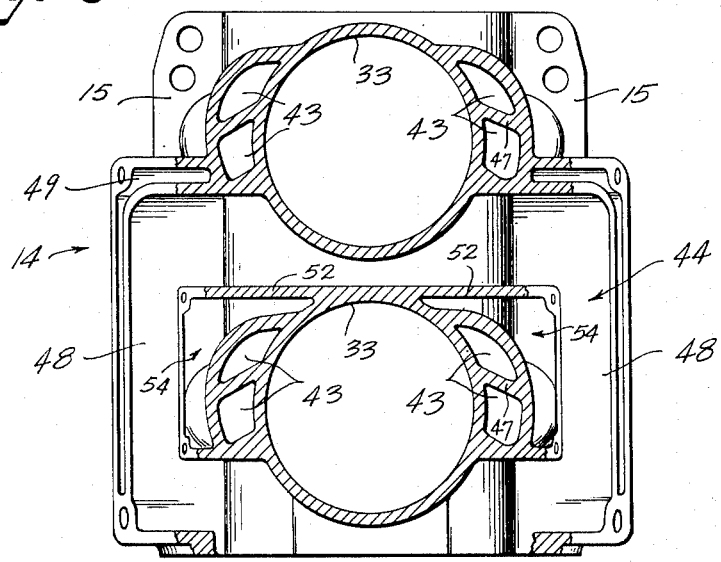
Fig. 10 is a transverse vertical section through the cylinder block taken on line 10—10 of Fig. 6.
Figure 11:
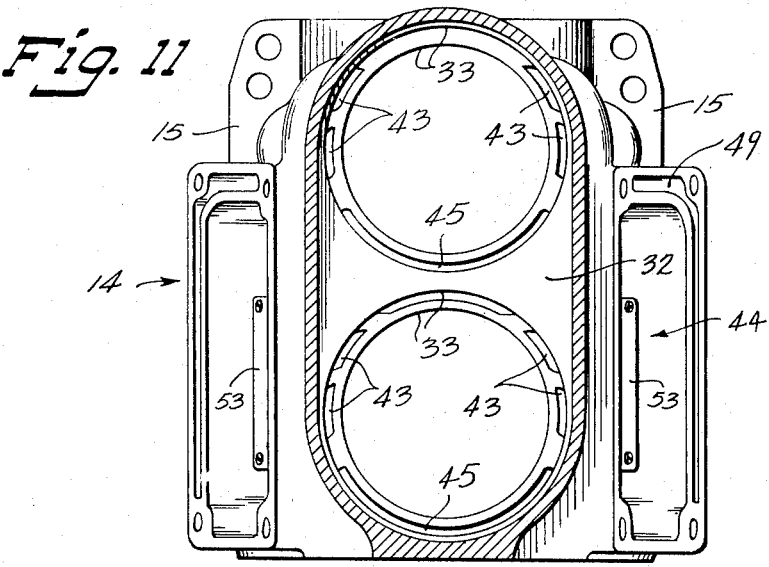
Fig. 11 is a transverse vertical section through the cylinder block taken on line 11—11 of Fig. 6.

In the engine shown, four intake and four exhaust ports are employed and drilled as illustrated in Fig. 7 in the section 28 of cylinder 10 and between the gaskets 35 and 36 of the assembled engine, as shown in Fig. 3.

Two pairs of intake ports 41 are drilled in each cylinder 10 in directions which converge upwardly and toward the inner wall of the combustion chamber 26 in a manner directing the fuel in two streams into the chamber which converge and travel along the chamber wall and against the dome 25 of the cylinder. In entering the chamber the fuel displaces the exhaust gases and tends to fill the chamber from the upper end thereof with a minimum loss of fuel passing directly across the cylinder and out through ports 42 or otherwise mixing with the exhaust gases and passing out therewith.

If desired, each passage 43 may be provided with the ribs 48, as shown, formed integrally with block 14 and disposed to supplement the directional function of ports 41.

Ports 42 are drilled in pairs and are angularly disposed with respect to each cylinder to direct downwardly of the cylinder the discharge of the exhaust gases displaced from the cylinder as described above so that the gases pass from the cylinder with a minimum of turbulence and change of direction.

To provide for the exhaust discharge from the lower end of engine 1 into housing 2, as described, ports 42 of the upper cylinder 10 are further disposed to direct the gases in two divergent streams obliquely against the lower wall 48 of cavity 44 and plates 46 so as to pass oppositely on each side of the lower cylinder without interference therewith.

In certain engine applications, not shown, the exhaust gases may be directly discharged from cavity 45 on opposite sides of the engine. Passages 43 also may be disposed entirely on one side of the engine and the exhaust ports 42 may open entirely on the other side of the engine. The type of engine application, the number of cylinders in line and other factors may be considered. In a single cylinder engine, interference of the exhaust gases with other cylinders will not, of course, be a consideration. As shown in engine 1, passages 43 are conveniently disposed to open into the wider portions of the respective crank chamber 21 on opposite sides of the engine.

Wall 48 of cavity 44 is preferably provided with the coolant chamber 49 which protects the engine crankcase against the heat of the exhaust and may be extended, as shown, along the upper opening of cavity 44 on each side of block 14.

The jackets 50 secured over plates 46 closing cavity 45 are provided with inwardly facing recesses 51 adapted to receive coolant for controlling the temperature of the engine.

Block 14 is adapted to be die-cast in a permanent mold, not shown, without requiring collapsible cores, or the like, and includes the wall members 52 also formed integrally with block 14 within cavity 44. Members 52 and the cover plates 53 define the coolant cavities 54 on each side of the engine overlying or enclosing the transfer passages 43 of the lower cylinder to protect the fuel entering the latter against the heat of the exhaust gases passing from the upper cylinder through cavity 44 and over the lower cylinder. Cavity 54 on each side of the engine also overlies portions of the lower crank chamber 22 and protects the latter against overheating. Control of the temperature of the exhaust gases from the upper cylinder passing between the water-cooled plates 46 and 53 is afforded for the more efficient operation of the engine. The construction shown and described immediately above is similar to that described and claimed in the copending application of the present inventor filed September 5, 1947, Serial Number 772,348, now Patent No. 2,506,271, May 2, 1950, for Internal-Combustion Engine and Cylinder Block Therefor.

The cylinders 10 of the present invention are easily assembled in block 14 and disassembled for inspection or replacement. The combustion chamber of each cylinder is wholly disposed in cavity 32 which is adapted to receive coolant from pipe 55 extending from suitable supply means, not shown, and opening into the lower end of the cavity from within the drive shaft housing 2.

Cylinders 10 may be replaced as for racing purposes with cylinders, not shown, providing different displacements, compression and timing of the exhaust and intake periods.

The invention affords higher speeds of two-cycle operation and a more favorable output by reason of the fact that the precompressed fuel charge is directed in an almost straight line from the wider portions of the crank chamber accommodating the sweep of the connecting rods all the way to the upper end of the combustion chamber with only nominal deflection through ports 41.

The compressed charge is directed through ports 41 into the combustion chamber away from exhaust ports 42 to substantially eliminate "short circuiting" of the charge through the cylinder and eliminates the usual possibility of faulty scavenging at low speeds.

The invention also provides for the more efficient elimination of the exhaust gases from the engine and particularly from the upper cylinders to the lower end of the engine which reduces the back pressures of the exhaust system and increases the effectiveness of the scavenging action of the precompressed fuel charge and the fuel efficiency of the engine.

Various embodiments of the invention may be employed within the scope of the following claims.

I claim:

1. In a two-cycle engine of the class described having a first and second cylinder disposed in-line, an exhaust chamber embracing said cylinders and opening at one end adjacent said first and removed from said second cylinder, and having side walls, and exhaust ports opening from said second cylinder to direct the exhaust gases in separate divergent streams obliquely against the side walls of said chamber to be deflected from the walls through said opening and pass around said first cylinder with a minimum of mechanical losses.

2. In a two-cycle engine of the class described, a cylinder block defining at least in part a crankcase induction chamber, and a water coolant jacket, a stepped cylindrical bore formed in said block opening into said chamber at its smaller end and said jacket at the larger end, a passage extending in said block from said crankcase chamber to the larger diameter of said bore, a cylinder having a closed end adapted to be disposed in said jacket and having stepped outer cylindrical dimensions fitting said bore, and intake ports formed in said cylinder registering with said passage.

3. In a two-cycle engine of the class described, a cylinder block defining at least in part a crankcase induction chamber and a water coolant jacket, a stepped cylindrical bore formed by said block opening at its smaller end into said crankcase chamber and at its larger end into said jacket and defining a shoulder facing toward said jacket, a passage formed in said block from said crankcase chamber extending alongside the smaller diameter of said bore and opening into the larger diameter of the same, a cylinder having a uniform cylindrical bore closed at one end and having stepped cylindrical outer dimensions fitting the bore of said block and defining a shoulder engaging the shoulder of said block, means seating said cylinder in the bore of said block and against the shoulder of said block, and intake ports formed in the thicker wall of said cylinder registering with said passage.

4. In an engine block, a separately formed removable cylinder therefor having respectively opposed pairs of intake and exhaust ports, said intake ports being directed upwardly of the cylinder against that portion of the inner cylinder wall between said intake ports.

5. In an engine of the class described, a cylinder having respectively opposed pairs of intake and exhaust ports, said intake ports being directed upwardly of the cylinder against that portion of the inner cylinder wall between said intake ports, said exhaust ports being directionally disposed diametrically oppositely of said intake ports, and a block having a cylindrical bore adapted to receive and carry the lower end of said cylinder and passages opening into said bore and communicating respectively with said ports.

6. In a two-cycle internal-combustion engine having a crankshaft and a number of pistons connected to said crankshaft, a cylinder member carrying each of said pistons, a block having cylindrical bores supporting said cylinder members in line with their axes parallel and defining at least in part corresponding crankcase induction chambers enclosing said crankshaft, passages defined by said block communicating at one end with opposite sides of said chambers and respectively extending oppositely and alongside each cylinder, an exhaust chamber defined at least in part by said block and embracing the said cylinders and said passages, intake ports opening from the opposite end of the respective passages in convergent directions into the upper interior of said cylinder and against the inner wall thereof immediately above said ports, and exhaust ports in said cylinder opening therefrom downwardly thereof into said chamber in divergent directions.

7. A two-cycle internal-combustion engine of the class described comprising a cylinder, an exhaust chamber adjacent said cylinder having opposite side walls and a discharge opening between said walls and oppositely of said cylinder, exhaust ports opening from and downwardly of said cylinder into said chamber to direct the exhaust gases in separate divergent streams obliquely against the lower and opposite walls of said chamber, said walls serving to deflect the exhaust gases through the opening of said chamber, and cavities formed in said walls to receive coolant to control the temperature of the same.

8. In a two-cycle engine of the class described and having a crank chamber, a cylinder block having a cavity adapted to receive coolant and a stepped cylindrical bore formed by said block opening at its smaller end into said crank chamber and at its larger end into said jacket and defining a shoulder facing toward said jacket, an exhaust chamber formed in said block opening into the larger diameter of said bore, a passage formed in said block from said crankcase chamber extending alongside the smaller diameter of said bore and opening into the larger diameter of the same, a cylinder member of stepped cylindrical outer dimensions fitting the bore of said block and defining a shoulder engaging the shoulder of said block means seating said cylinder in the bore of said block and against the shoulder of said block, intake ports formed in the thicker wall of said cylinder registering with said passage, a gasket disposed between said shoulders in sealing engagement therewith, and a second gasket in sealing engagement between said cylinder member and the bore of said block on the side of said ports oppositely of said first named gasket.

ELMER C. KIEKHAEFER.

REFERENCES CITED

The following references are of record in the file of this patent:

UNITED STATES PATENTS

| Number | Name | Date |
|---|---|---|
| 870,240 | Libby, Jr. | Nov. 5, 1907 |
| 1,664,782 | Magdeburger | Apr. 3, 1928 |
| 1,719,388 | Booth et al. | July 2, 1929 |
| 2,349,305 | Pyk | May 23, 1944 |
| 2,440,645 | Pyk et al. | Apr. 27, 1948 |

FOREIGN PATENTS

| Number | Country | Date |
|---|---|---|
| 219,031 | Great Britain | Aug. 20, 1925 |
| 410,913 | Great Britain | of 1934 |
| 515,452 | Great Britain | of 1939 |
| 764,109 | France | of 1914 |